United States Patent
Liu et al.

(10) Patent No.: US 11,069,888 B2
(45) Date of Patent: Jul. 20, 2021

(54) ANODE STRUCTURE WITH BINDERS FOR SILICON AND STABILIZED LITHIUM METAL POWDER

(71) Applicant: Applied Materials, Inc., Santa Clara, CA (US)

(72) Inventors: Gao Liu, Piedmont, CA (US); Sergey D. Lopatin, Morgan Hill, CA (US); Eric H. Liu, Los Altos, CA (US); Ajey M. Joshi, San Jose, CA (US); Guo Ai, Guangdong (CN); Zhihui Wang, Fremont, CA (US); Hui Zhao, Boston, MA (US); Donghai Wang, State College, PA (US)

(73) Assignee: APPLIED MATERIALS, INC., Santa Clara, CA (US)

(*) Notice: Subject to any disclaimer, the term of this patent is extended or adjusted under 35 U.S.C. 154(b) by 227 days.

(21) Appl. No.: 16/067,795

(22) PCT Filed: Jan. 4, 2017

(86) PCT No.: PCT/US2017/012192
§ 371 (c)(1),
(2) Date: Jul. 2, 2018

(87) PCT Pub. No.: WO2017/123443
PCT Pub. Date: Jul. 20, 2017

(65) Prior Publication Data
US 2019/0013513 A1    Jan. 10, 2019

Related U.S. Application Data

(60) Provisional application No. 62/278,239, filed on Jan. 13, 2016.

(51) Int. Cl.
*H01M 4/139*    (2010.01)
*H01M 4/62*    (2006.01)
(Continued)

(52) U.S. Cl.
CPC ......... *H01M 4/139* (2013.01); *H01M 4/0402* (2013.01); *H01M 4/0404* (2013.01);
(Continued)

(58) Field of Classification Search
CPC .... H01M 4/139; H01M 4/0404; H01M 4/622; H01M 4/382; H01M 4/587; H01M 4/366;
(Continued)

(56) References Cited

U.S. PATENT DOCUMENTS

| | | |
|---|---|---|
| 6,555,268 B1 | 4/2003 | Inoue et al. |
| 2006/0228468 A1 | 10/2006 | Lain et al. |

(Continued)

FOREIGN PATENT DOCUMENTS

| | | |
|---|---|---|
| JP | 2007-502002 A | 2/2007 |
| JP | 2014-502006 A | 1/2014 |
| WO | 2012099264 A1 | 7/2012 |

OTHER PUBLICATIONS

Bitsch, Boris et al., "A novel slurry concept for the fabrication of lithium-ion battery electrodes with beneficial properties", Journal of Power Sources, 2014, vol. 265, pp. 81-90 See 2. Experimental; 4. Conclusions; and Fig. 6.

(Continued)

*Primary Examiner* — Osei K Amponsah
(74) *Attorney, Agent, or Firm* — Patterson + Sheridan LLP (57) ABSTRACT

A simple solution processing method is developed to achieve uniform and scalable stabilized lithium metal powder coating on Li-ion negative electrode. A solvent and binder system for stabilized lithium metal powder coating is developed, including the selection of solvent, polymer binder and enhancement of polymer concentration. The enhanced binder solution is 1% concentration of polymer binder in xylene, and the polymer binder is chosen as the (Continued)

mixture of poly(styrene-co-butadiene) rubber (SBR) and polystyrene (PS). Long-sustained, uniformly dispersed stabilized lithium metal powder suspension can be achieved with the enhanced binder solution. A uniform stabilized lithium metal powder coating can be achieved with simple doctor blade coating method and the resulting stabilized lithium metal powder coating can firmly glued on the anode surface. With the prelithiation of negative electrode by stabilized lithium metal powder, improvements in electrochemical performances are demonstrated in both graphite/NMC and SiO/NMC full-cell.

19 Claims, 6 Drawing Sheets

(51) Int. Cl.
| | | |
|---|---|---|
| H01M 4/04 | (2006.01) | |
| H01M 4/38 | (2006.01) | |
| H01M 4/587 | (2010.01) | |
| H01M 4/36 | (2006.01) | |
| H01M 4/48 | (2010.01) | |
| H01M 10/0525 | (2010.01) | |
| H01M 4/1395 | (2010.01) | |
| H01M 10/052 | (2010.01) | |
| H01M 4/134 | (2010.01) | |
| H01M 4/02 | (2006.01) | |

(52) U.S. Cl.
CPC ......... *H01M 4/0435* (2013.01); *H01M 4/134* (2013.01); *H01M 4/1395* (2013.01); *H01M 4/366* (2013.01); *H01M 4/382* (2013.01); *H01M 4/483* (2013.01); *H01M 4/587* (2013.01); *H01M 4/622* (2013.01); *H01M 10/052* (2013.01); *H01M 10/0525* (2013.01); *H01M 2004/027* (2013.01)

(58) Field of Classification Search
CPC ............... H01M 4/483; H01M 4/0435; H01M 2004/027; H01M 10/0525
See application file for complete search history.

(56) References Cited

U.S. PATENT DOCUMENTS

| | | | |
|---|---|---|---|
| 2009/0061321 A1* | 3/2009 | Yakovleva | B22F 1/0062 429/231.95 |
| 2012/0105007 A1 | 5/2012 | Amiruddin et al. | |
| 2014/0106217 A1* | 4/2014 | Lee | H01M 4/622 429/217 |
| 2014/0349185 A1* | 11/2014 | Momose | H01M 4/0404 429/217 |
| 2016/0276635 A1* | 9/2016 | Ju | H01M 2/1022 |

OTHER PUBLICATIONS

Ai, Guo et al., "Scalable process for application of stabilized lithium metal powder in Li-ion batteries", Journal of Power Sources, Feb. 5, 2016 (Published online), vol. 309, pp. 33-41 See abstract; 2. Experimental methodology; and 4. Conclusion.
International Search Report and Written Opinion dated Apr. 17, 2017 for Application No. PCT/US2017/012192.
Office Action for Chinese Application No. 201780006762.4 dated Nov. 12, 2020.
Search Report for Chinese Application No. 201780006762.4 dated Nov. 4, 2020.
Office Action for Japanese Application No. 2018-536251 dated Dec. 22, 2020.

* cited by examiner

ANODE STRUCTURE WITH BINDERS FOR SILICON AND STABILIZED LITHIUM METAL POWDER

GOVERNMENT RIGHTS IN THIS INVENTION

This invention was made with U.S. government support under contract number DE-AC02-05CH11231. The U.S. government has certain rights in this invention.

BACKGROUND

Field

Implementations of the present disclosure generally relate to high-capacity energy storage devices and energy storage device components, and more specifically, to compositions and methods for fabricating such high-capacity energy storage devices and energy storage device components using processes that incorporate stabilized lithium metal powder (e.g., "SLMP").

Description of the Related Art

Lithium-ion batteries are a type of rechargeable battery in which lithium ions move between the negative and positive electrode. The lithium ion moves through an electrolyte from the negative to the positive during discharge, and in reverse, from the positive to the negative, during recharge. Most commonly, the negative electrode is made of graphite, which is particularly preferred due to its stability during charge and discharge cycles as graphite forms solid electrolyte interface (SEI) layers with very small volume change.

Current Li-ion battery technology is facing increasing demand for higher energy density and higher power output for portable electronic devices and electric vehicle applications. Intensive efforts aim to improve the performance of Li-ion batteries. The next generation of Li-ion batteries with high-energy density alloying anode materials, such as silicon, germanium and tin, have attracted significant attention. A limitation of these materials is the high irreversible capacity loss (20-40% depending on the cell chemistry), which results in low coulombic efficiency (CE) in the initial cycles.

In an effort to design high-power batteries, the reduction of active material particle size to nanoscale dimensions can help shorten the diffusion length of charge carriers, enhance the lithium-ion diffusion coefficient and therefore achieve faster reaction kinetics. However, the usage of nanoscale active material particles typically leads to higher first cycle irreversible capacity loss due to a larger reaction area for solid electrolyte interphase ("SEI") formation. A lot of effort has been put forth to compensate for this capacity inefficiency, such as excess cathode material loading, increased lithium salt concentration, lithium sacrificial salts, lithium rich cathode material and the application of stabilized lithium metal powder ("SLMP"). However, a need remains for high-energy storage devices and improved methods for forming high-energy storage devices.

SUMMARY

Implementations of the present disclosure generally relate to high-capacity energy storage devices and energy storage device components, and more specifically, to compositions and methods for fabricating such high-capacity energy storage devices and energy storage device components using processes that incorporate stabilized lithium metal powder ("SLMP"). In one implementation, a method for making an electrode structure is provided. The method comprises forming a binder solution of a hydrocarbon solvent, styrene-butadiene-rubber (SBR) and polystyrene (PS), adding stabilized lithium metal powder (SLMP) to the binder solution to form a slurry, depositing a film of the slurry on a substrate and exposing the film and substrate to a drying process to form the electrode structure.

In another implementation, a method for forming a stabilized lithium metal powder (SLMP) suspension is provided. The method comprises dissolving styrene-butadiene-rubber (SBR) and polystyrene (PS) in xylene to form a binder solution and adding SLMP to the binder solution to form the SLMP suspension.

In yet another implementation, a method of forming a battery is provided. The method comprises forming an electrode structure. The electrode structure is formed by forming a binder solution of a hydrocarbon solvent, styrene-butadiene-rubber (SBR) and polystyrene (PS), adding stabilized lithium metal powder (SLMP) to the binder solution to form a slurry, depositing a thin film of the slurry on a substrate and exposing the thin film and substrate to a drying process to form the electrode structure. The method further comprises combining the electrode structure with a positive electrode structure, a first current collector contacting the positive electrode structure, a second current collector contacting the electrode structure and a separator positioned between the positive electrode structure and the negative electrode structure.

BRIEF DESCRIPTION OF THE DRAWINGS

So that the manner in which the above-recited features of the present disclosure can be understood in detail, a more particular description of the implementations, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

To facilitate understanding, identical reference numerals have been used, where possible, to designate identical elements that are common to the figures. It is contemplated that elements and features of one implementation may be beneficially incorporated in other implementations without further recitation.

DETAILED DESCRIPTION

The following disclosure describes stabilized lithium metal powder ("SLMP") and methods for forming electrodes containing SLMP. Certain details are set forth in the following description and in FIGS. 1-4 to provide a thorough understanding of various implementations of the disclosure. Other details describing well-known structures and systems often associated with forming electrodes and SLMP are not set forth in the following disclosure to avoid unnecessarily obscuring the description of the various implementations.

Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

SLMP are lithium metal particles typically coated with a thin layer of a lithium salt (e.g., $Li_2CO_3$). This thin lithium salt protective coating enables handling of the SLMP in a dry room atmosphere, which greatly widens usage of the SLMP. The SLMP typically have a very high capacity of 3600 $mAhg^{-1}$ and can efficiently compensate for the first cycle capacity loss through a prelithiation effect. Additionally, the SLMP have several attractive usages. First, SLMP can prelithiate anode electrodes, especially alloyed anodes or nanoscale anodes, to compensate for the loss of lithium from the cathode during SEI formation to achieve high-energy density and high power density battery. Second, SLMP prelithiation can replace the electrically charged formation process in Li-ion battery manufacturing. It is well known that the electrically charged formation process is crucial for forming a good SEI layer, which is crucial in battery performance. However, the electrically charged formation process is both an energy and time consuming process. A high quality SEI layer can be formed during SLMP prelithiation process, in which only SLMP loading, activation and 48-hour rest are required. Third, SLMP can function as an independent source of lithium in some non-lithiated cathode materials with high specific capacities, such as reduced graphene oxide/$Fe_2O_3$ composites, $V_6O_{13}$, $MnO_2$ and metal fluorides, such as $BiF_3$. These non-lithiated cathode materials are non-lithium providing cathodes and some can exhibit very high gravimetric and volumetric energy densities when they are coupled with SLMP prelithiated anodes in Li-ion devices.

Although SLMP has been proven cost-effective in Li-ion device applications; handling and application of SLMP on an anode surface can be challenging. The lithium salt protective layer on the SLMP surface needs to be broken to expose lithium metal and enable electrical contact between lithium and anode to achieve SLMP prelithiation. Therefore, the pressure activation feasibility of SLMP should also be taken into account. Previously, efficient activation of SLMP was studied and high first cycle coulombic efficiency as well as excellent long-term cycling performances were achieved in a graphite/NMC full-cell. However, the need for SLMP research is not only limited to studying the mechanism and potentinal application prelithiation effect of SLMP, but is also applicable to achieving a safer, less expensive and scalable process for Li-ion devices. Spray methods for SLMP coating typically use a surfactant to improve the dispersion of SLMP. This surfactant may lead to undesirable side reactions.

In some implementations of the present disclosure, a solution-processed slot-die coating method, which achieves uniform and scalable SLMP coating on an anode surface, is provided. In some implementations, polymer binders are introduced into the coating solution to assist and maintain uniform SLMP dispersion for prolonged processing time and act as binder to fix the SLMP on the anode surface. With some of the implementations described herein, controllable and uniform SLMP coatings are formed on electrode surfaces. These SLMP coatings are easily activated by applying calendering pressure. The prelithiation effect of SLMP achieved with some implementations of the present disclosure is demonstrated via the electrochemical performances in both graphite/NMC and SiO/NMC full-cell.

Figure 1:
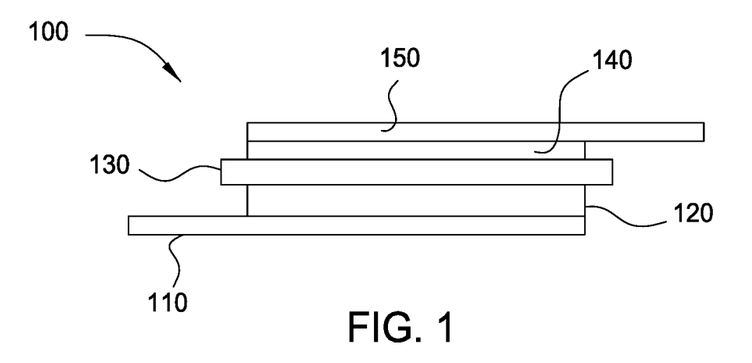
FIG. 1 illustrates a cross-sectional view of one implementation of a Li-ion battery structure having an electrode structure formed according to implementations described herein.

FIG. 1 illustrates an example of a Li-ion battery structure 100 having a negative electrode structure 140 formed according to implementations of the present disclosure. The Li-ion battery structure 100 has a positive current collector 110, a positive electrode structure 120, a separator 130, the negative electrode structure 140 and a negative current collector 150. Note in FIG. 1 that the current collectors are shown to extend beyond the stack, although it is not necessary for the current collectors to extend beyond the stack, the portions extending beyond the stack may be used as tabs.

The current collectors 110, 150, on positive electrode structure 120 and negative electrode structure 140, respectively, can be identical or different electronic conductors. Examples of metals that the current collectors 110, 150 may be comprised of include aluminum (Al), copper (Cu), zinc (Zn), nickel (Ni), cobalt (Co), tin (Sn), silicon (Si), manganese (Mn), magnesium (Mg), alloys thereof, and combinations thereof. In one implementation, at least one of the current collectors 110, 150 is perforated. Furthermore, current collectors may be of any form factor (e.g., metallic foil, sheet, or plate), shape and micro/macro structure. Generally, in prismatic cells, tabs are formed of the same material as the current collector and may be formed during fabrication of the stack, or added later. All components except current collectors 110 and 150 contain lithium ion electrolytes.

The negative electrode structure 140 or anode is formed according to the implementations described herein. The negative electrode structure 140 may have an energy capacity greater than or equal to 372 mAh/g, preferably 700 mAh/g, and most preferably 1000 mAh/g. The negative electrode structure 140 may comprise carbon (e.g., coke, graphite), silicon (e.g., silicon oxide), or combinations thereof. The negative electrode structure 140 may further comprise materials such as lithium, nickel, copper, tin, indium, oxides thereof, or combinations thereof. The negative electrode structure 140 is coated with a film containing SLMP according to one or more implementations disclosed herein.

The positive electrode structure 120 or cathode may be any material compatible with the anode and may include an intercalation compound, an insertion compound, or an electrochemically active polymer. Suitable intercalation materials include, for example, lithium-containing metal oxides, $MoS_2$, $FeS_2$, $MnO_2$, $TiS_2$, $NbSe_3$, $LiCoO_2$, $LiNiO_2$, $LiMnO_2$, $LiMn_2O_4$, $V_6O_{13}$, $V_2O_5$, $BiF_3$, and $Fe_2O_3$. Suitable polymers include, for example, polyacetylene, polypyrrole, polyaniline, and polythiopene. The positive electrode structure 120 or cathode may be made from a layered oxide, such as lithium cobalt oxide, an olivine, such as lithium iron phosphate, or a spinel, such as lithium manganese oxide. Exemplary lithium-containing oxides may be layered, such as lithium cobalt oxide ($LiCoO_2$), or mixed metal oxides, such as $LiNi_xCo_{1-2x}MnO_2$, $LiNiMnCoO_2$ ("NMC"), $LiNi_{0.5}Mn_{1.5}O_4$, $Li(Ni_{0.8}Co_{0.15}Al_{0.05})O_2$, $LiMn_2O_4$, and doped lithium rich layered-layered materials, wherein x is zero or a non-zero number. Exemplary phosphates may be iron olivine ($LiFePO_4$) and it is variants (such as $LiFe_{(1-x)}Mg_xPO_4$), $LiMoPO_4$, $LiCoPO_4$, $LiNiPO_4$, $Li_3V_2(PO_4)_3$, $LiVOPO_4$, $LiMP_2O_7$, or $LiFe_{1.5}P_2O_7$, wherein x is zero or a non-zero number. Exemplary fluorophosphates may be $LiVPO_4F$, $LiAlPO_4F$, $Li_5V(PO_4)_2F_2$, $Li_5Cr(PO_4)_2F_2$, $Li_2CoPO_4F$, or $Li_2NiPO_4F$. Exemplary silicates may be $Li_2FeSiO_4$, $Li_2MnSiO_4$, or $Li_2VOSiO_4$. An exemplary non-lithium compound is $Na_5V_2(PO_4)_2F_3$.

In some implementations of the present disclosure, lithium is contained in atomic layers of crystal structures of carbon graphite ($LiC_6$) at the negative electrode structure 140 and $LiNiMnCoO_2$ ("NMC") at the positive electrode structure 120, for example, although in some implementations the negative electrode structure 140 may also include lithium absorbing materials such as silicon, tin, etc. The Li-ion battery structure 100, even though shown as a planar structure, may also be formed into a cylinder by rolling the stack of layers; furthermore, other cell configurations (e.g., prismatic cells, button cells) may be formed.

In one implementation, the separator 130 is a porous polymeric ion-conducting polymeric substrate. In one implementation, the porous polymeric substrate is a multi-layer polymeric substrate. In some implementations, the separator 130 consists of any commercially available polymeric microporous membranes (e.g., single or multi-ply), for example, those products produced by Polypore (Celgard LLC., of Charlotte, N.C.), Toray Tonen (Battery separator film (BSF)), SK Energy (lithium ion battery separator (LiBS), Evonik industries (SEPARION® ceramic separator membrane), Asahi Kasei (Hipore™ polyolefin flat film membrane), DuPont (Energain®), etc.

Electrolytes infused in cell components 120, 130 and 140 can be comprised of a liquid/gel or a solid polymer and may be different in each. In some implementations, the electrolyte primarily includes a salt and a medium (e.g., in a liquid electrolyte, the medium may be referred to as a solvent; in a gel electrolyte, the medium may be a polymer matrix). The salt may be a lithium salt. The lithium salt may include, for example, $LiPF_6$, $LiAsF_6$, $LiCF_3SO_3$, $LiN(CF_3SO_3)_3$, $LiBF_6$, and $LiClO_4$, BETTE electrolyte (commercially available from 3M Corp. of Minneapolis, Minn.) and combinations thereof. Solvents may include, for example, ethylene carbonate (EC), propylene carbonate (PC), EC/PC, 2-MeTHF (2-methyltetrahydrofuran)/EC/PC, EC/DMC (dimethyl carbonate), EC/DME (dimethyl ethane), EC/DEC (diethyl carbonate), EC/EMC (ethyl methyl carbonate), EC/EMC/DMC/DEC, EC/EMC/DMC/DEC/PE, PC/DME, and DME/PC. Polymer matrices may include, for example, PVDF (polyvinylidene fluoride), PVDF:THF (PVDF:tetrahydrofuran), PVDF:CTFE (PVDF:chlorotrifluoroethylene) PAN (polyacrylonitrile), and PEO (polyethylene oxide).

Figure 2:
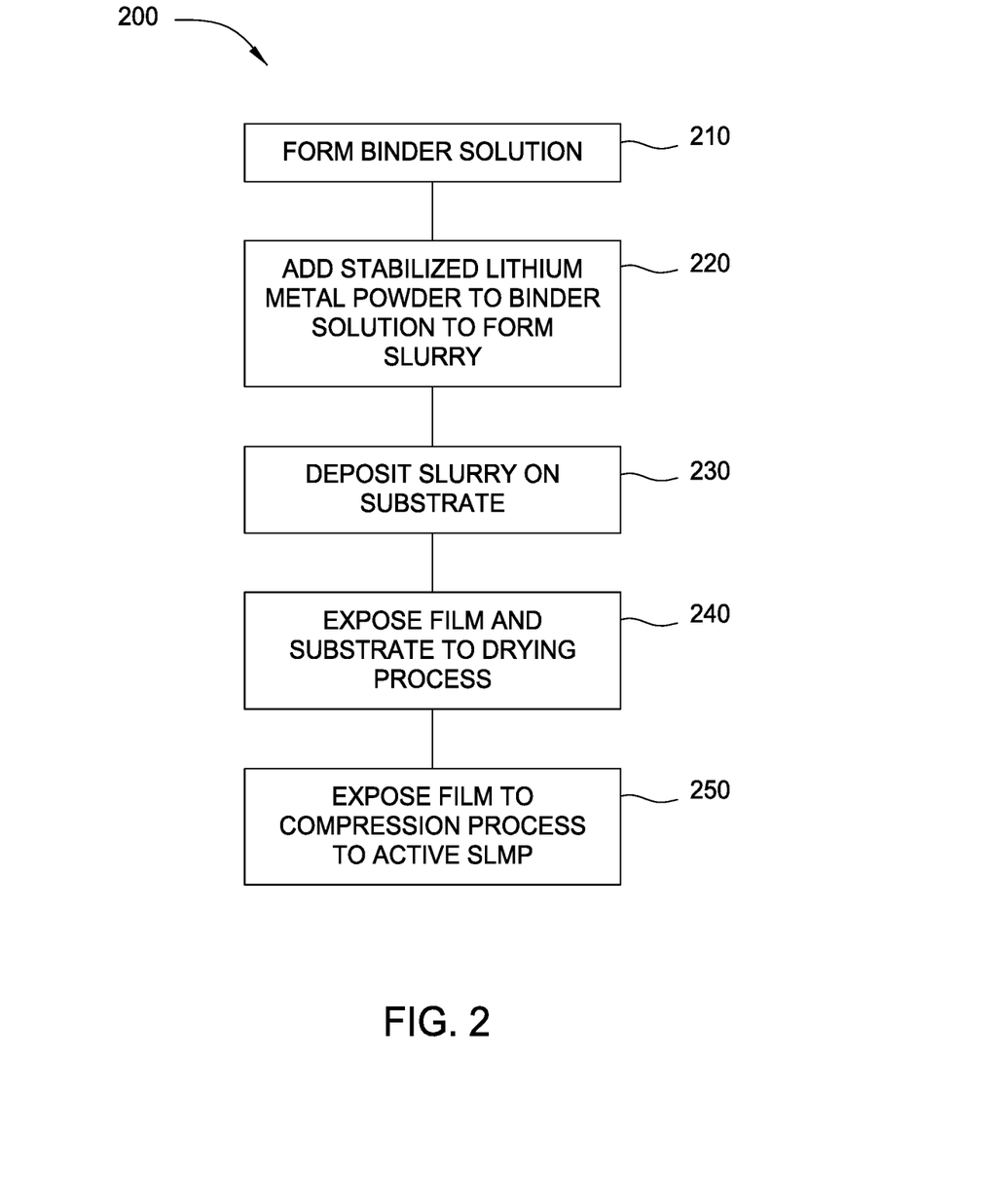
FIG. 2 illustrates a process flow chart summarizing one implementation of a method for forming an electrode structure according to implementations described herein.

FIG. 2 illustrates a process flow chart summarizing one implementation of a method 200 for forming an electrode structure according to implementations described herein. In some implementations, the electrode structure formed by method 200 is the negative electrode structure 140 depicted in FIG. 1.

At operation 210, a binder solution is formed. In some implementations, the binder solution comprises one or more polymers dissolved in a solvent system. In one implementation, the one or more polymers are selected from styrene butadiene rubber (SBR), polystyrene (PS), and combinations thereof. In one implementation, the solvent system comprises a hydrocarbon solvent such as xylene, toluene, or combinations thereof. In one implementation, the binder solution comprises styrene butadiene rubber (SBR), and polystyrene (PS) dissolved in xylene.

In one implementation, a concentration of SBR in the binder solution is between about 0.1% and about 5% by weight of the total weight of the binder solution (e.g., between about 0.1% and about 1% by weight; between about 0.2% and about 0.8% by weight; between about 0.3% and about 0.7% by weight; between about 0.4% and about 0.6% by weight; or between about 0.5% and about 1% by weight). In one implementation, a concentration of PS in the binder solution is between about 0.1% and about 5% by weight of the total weight of the binder solution (e.g., between about 0.1% and about 1% by weight; between about 0.2% and about 0.8% by weight; between about 0.3% and about 0.7% by weight; between about 0.4% and about 0.6% by weight; or between about 0.5% and about 1% by weight). In one implementation, the concentration of the SBR in the binder solution is about 0.5% by weight and the concentration of PS in the binder solution is about 0.5% by weight of the total weight of binder solution. In one implementation, the concentration of the SBR in the binder solution is between about 0.1% and about 1% by weight and the concentration of PS in the binder solution is between about 0.1% and about 1% by weight of the total weight of binder solution. In one implementation, the total concentration of PS and SBR in the binder solution does not exceed about 1% by weight of the total weight of binder solution.

In one implementation, a viscosity of the binder solution is about 2.5 centipoise (cp) or greater at 20 degrees Celsius. In another implementation, a viscosity of the binder solution is about 3.6 centipoise (cp) or greater at 20 degrees Celsius. In yet another implementation, a viscosity of the binder solution is about 4.8 centipoise (cp) or greater at 20 degrees Celsius. In yet another implementation, a viscosity of the binder solution is between about 2.5 centipoise (cp) and about 4.8 cp at 20 degrees Celsius (e.g., between about 2.5 cp and about 3.6 cp at 20 degrees Celsius; or between about 3.6 cp to about 4.8 cp at 20 degrees Celsius).

At operation 220, stabilized lithium metal powder is added to the binder solution to form a binder suspension or slurry. In one implementation, the stabilized lithium metal powder is coated with a thin layer of lithium salt. Examples of lithium salts include lithium carbonate, lithium oxide, lithium hydroxide, lithium phosphate, or a combination of any two or more thereof. In some implementations, the coating is about 10 nm to about 200 nm thick on the stabilized lithium metal particle. In some implementations, the particle size of the stabilized lithium metal particles is less than about 150 µm. In some implementations, the particle size of the stabilized lithium metal particles is about 125 µm, about 100 µm, about 75 µm, about 50 µm, about 30 µm, about 20 µm, about 10 µm, about 5 µm, about 1 µm, about 100 nm, or any range between any two of these values or less than any one of these values. In some implementations, the particle size of the stabilized lithium metal particles is between about 5 µm to about 150 µm (e.g., from about 5 µm to about 50 µm, or from about 100 µm to about 150 µm).

In one implementation, the stabilized lithium metal particles are present in an amount of about 0.1 wt. % to about 5 wt. % of the total weight of the binder suspension or slurry with binder solution typically present as the remainder (e.g., an amount of about 95 wt. % to about 99 wt. % of the total weight of the binder suspension or slurry). In one implementation, the stabilized lithium metal particles are present in an amount of about 0.5 wt, % to about 4 wt. % of the binder suspension or slurry. The stabilized lithium metal particles may be present in an amount of about 0.1 wt. %, 0.2 wt. %, 0.5 wt. %, about 1 wt. %, about 1.2 wt. %, about 1.4 wt. %, about 1.6 wt. %, about 1.8 wt. %, about 2 wt. %, about 2.2 wt. %, about 2.4 wt. %, about 2.6 wt %, about 2.8 wt. %, about 3 wt. %, about 3.2 wt. %, about 3.4 wt. %, about 3.6 wt, %, about 3.8 wt. %, about 4 wt. %, about 4.2 wt. %, about 4.4 wt %, about 4.6 wt. %, about 4.8 wt. %, %, about 5.0 wt. % or any range between any two of these values of the total weight of the binder suspension or slurry.

In one implementation, the binder solution is present in an amount of about 95 wt. % to about 99.9 wt. % of the total weight of the binder suspension or slurry. The binder solution may be present in an amount of about 95.0 wt. %, 95.2 wt. %, 95.5 wt. %, about 96 wt. %, about 96.2 wt. %, about 96.4 wt. %, about 96.6 wt. %, about 96.8 wt. %, about 97 wt. %, about 97.2 wt. %, about 97.4 wt. %, about 97.6 wt. %, about 97.8 wt. %, about 98 wt. %, about 98.2 wt. %, about 98.4 wt. %, about 98.6 wt. %, about 98.8 wt. %, about 99.0 wt. % or any range between any two of these values of the total weight of the binder suspension or slurry.

In one implementation, PS and SBR are present in an amount of about 1% total and the remainder is solvent based on the total weight of the binder solution, stabilized lithium metal particles are present in an amount of about 0.5 wt. to about 4 wt. %, and the remainder is binder solution based on the total weight of the binder suspension or slurry.

At operation 230, the binder suspension or slurry is deposited on the substrate to form a film on the surface of the substrate. In one implementation, the binder suspension or slurry is deposited using a doctor blade process, dip coating, slot-die coating process, and/or gravure coating process. In some implementations, the slurry is mixed to provide a homogenous mixture. In some implementations, the binder suspension or slurry is constantly mixed prior to deposition on the substrate. In some implementations, a distance between where the binder suspension or slurry is released from the deposition mechanism and the surface of the substrate where the slurry is deposited is greater than 100 µm (e.g., from about 100 µm to about 500 µm; from about 100 µm to about 300 µm; or from about 200 µm to about 400 µm).

At operation 240, the film is exposed to a drying process. The film may be exposed to the drying process to remove any solvents remaining from the binder solution and/or deposition process. In one implementation, the drying process evaporates the hydrocarbon solvent from the electrode structure. The drying process may comprise, but is not limited to, drying processes such as an air-drying process, for example, exposing the porous layer to heated nitrogen, an infrared drying process, or an annealing process.

At operation 250, the film is exposed to a compression process to activate the SLMP. Not to be bound by theory but it is believed that the compression process activates the SLMP by breaking the protective lithium salt coating on the SLMP. After the particles are deposited over the conductive substrate, the particles may be compressed using physical compression techniques, for example, a calendering process, to achieve a desired net density of compacted particles while planarizing the surface of the layer. Any suitable compression technique that sufficiently activates the SLMP may be used.

Optionally, after formation of the electrode structure, a battery may be formed by combining the electrode structure with a separator and a cathode structure. A Li-ion battery with an electrode structure according to implementations of the present disclosure may be combined with a positive electrode structure, separator and current collectors to form a battery such as the Li-ion battery structure 100 schematically shown in FIG. 1. The integration of the electrode structure with the other battery components may occur in the same manufacturing facility used for fabricating the electrode structure, or the electrode structure may be shipped on and integration may occur elsewhere.

In one implementation, the process of fabricating a battery proceeds generally as follows: separator, negative electrode structure and positive electrode structure are provided; the separator, negative electrode structure and positive electrode structure are individually cut into sheets of the desired size for a cell; tabs are added to the cut sheets of positive and negative electrode structures; the cut sheets of positive and negative electrode structures and separators are combined to form battery cells; battery cells may be wound or stacked to form the desired battery cell configuration; after the winding or stacking, the battery cells are placed in cans, the cans are evacuated, filled with electrolyte and then sealed.

The foregoing electrode structure, while primarily designed for use in high-energy rechargeable lithium batteries, may be used in other battery systems.

EXAMPLES

The following non-limiting examples are provided to further illustrate implementations described herein. However, the examples are not intended to be all-inclusive and are not intended to limit the scope of the implementations described herein.

Materials and Electrode Fabrication

The graphite anode mixture includes graphite (CGP-G8 graphite powder, available from ConocoPhillips), carbon black ("DENKA BLACK," available from Denka Company Limited), and polyvinylidene fluoride (PVDF, available from Kureha America, Inc.). The SiO anode includes carbon-coated SiO (available from Hydro-Québec) and poly (9,9-dioctylfluorene-co-fluorenone-co-methylbenzoic ester) (PFM, synthesized by the inventors). Stabilized Lithium Metal Powder (SLMP®) was obtained from FMC Corporation. A Lithium Nickel Manganese Cobalt Oxide ($LiNi_{1/3}Mn_{1/3}Co_{1/3}O_2$) cathode was obtained from Umicore. N-Methyl-2-pyrrolidone (NMP) (anhydrous, 99.5%), chlorobenzene, toluene and xylene were obtained from Sigma-Aldrich®. Poly(styrene-co-butadiene) (SBR) was obtained from Sigma-Aldrich®. Polystyrene (PS) with molecular weight 2,000,000 was obtained from Alfa Aesar.

The anode slurry was composed of 89 wt. % CGP-G8 graphite powder, 8 wt. % PVDF and 3 wt. % acetylene black (AB) and was homogenized with a Polytron® PT10-35 homogenizer before lamination. The graphite slurry was then coated with a Mitutoyo doctor blade on a Yoshimitsu Seiki vacuum coater. The current collector was an 18-μm thick battery grade copper sheet. Typical mass loading of active material was 6.5 mg/cm$^2$. After NMP dried off, the electrode was further dried in vacuum oven at 130 degrees Celsius for 16 hours before SLMP loading. The same mixing and coating procedure was applied for the SiO laminate, which is made by 95 wt. % SiO powder and 5% PFM conductive binder in chlorobenzene. Typical mass loading of the SiO was 1.2 mg/cm$^2$. The cathode laminate for CGP-G8 graphite is 85 wt. % $LiNi_{1/3}Mn_{1/3}Co_{1/3}O_2$, 8 wt. % PVDF and 7 wt. % AB. The cathode laminate for the SiO was made by Argonne National Laboratory with 90 wt. % NCM-622, 5 wt. % PVDF (Solef® 5130, available from Solvay) and 5 wt. % carbon black (TIMCAL SUPER C45 carbon black).

SLMP Coating Procedure

The binder solution was made by dissolving SBR and PS in xylene with different weight ratios. Then SLMP was added and well dispersed in the binder solution to form an SLMP suspension with an SLMP weight ratio of 0.5% (for graphite) and 2.0% (for SiO). The loading amount was controlled by varying the amount of SLMP in solution. Then the SLMP suspension was coated on the anode laminate with a doctor blade method. The gap for the doctor blade was also tunable to control the SLMP loading on the laminate surface. After the xylene dried off, the electrode with SLMP coating was calendered with a rolling press (EQ-MR 100A available from MTI Corporation) to activate the SLMP. Then the laminate was punched for cell assembling.

Cell Assembly and Testing

The prelithiation effect of SLMP was tested by making a BR2325-type coin cell (parts from National Research Council Canada). The SLMP-loaded cells were assembled in an argon-filled glove box with an oxygen-mixing ratio less than 0.2 ppm. The pressure activated SLMP-graphite and SLMP-SiO were used as anodes. The counter electrodes for the half-cell were a lithium metal disk of 11/16" OD (Li foil from FMC-Lithium Co.). The electrolyte for the graphite half and full-cell was composed of a 1M $LiPF_6$ solution in ethyl carbonate (EC) and diethyl carbonate (DEC) with volume ratio of 1:1 purchased from BASF. The electrolyte for SiO half and full-cell was composed of a 1M $LiPF_6$ solution in ethyl carbonate (EC) and diethyl carbonate (DEC) with weight ratio of 3:7 containing 30 wt. % fluoroethylene carbonate (FEC) purchased from BASF. A Celgard® 2400 separator was obtained from Celgard®. Galvanostatic cycling tests were performed on a Series 4000 cell tester available from Maccor, Inc. For graphite and SiO half-cells, the voltage window was 0.01-1.0 V. The cells containing pressure activated SLMP were rested for certain period of time (two days) at open circuit before cycling to let prelithiation reach equilibrium. For the full-cell, the ratio of area capacity for cathode and anode was 1:1. The capacity of the cell was calculated based on the cathode.

Material Characterization

Morphology of the electrode surface was characterized with a JSM-7500F scanning electron microscope at the National Center for Electron Microscopy (NCEM) of Molecular Foundry at Lawrence Berkeley National Laboratory. The viscosity was tested via DV-E Viscometer manufactured by Brookfield. The tests were performed at a room temperature of 23 degrees Celsius.

Results

Solvent for Solution Processing Method

In some implementations of the present disclosure, the compatibility between solvent and SLMP is important. According to previous reports, SLMP is not compatible with some polar solvents, such as 1-Methyl-2-pyrrolidinone (NMP). Only hydrocarbon solvents, such as hexane, toluene and xylene, are stable towards lithium metal. As for the selection of binders for the SLMP slurry, poly(styrene-co-butadiene) (SBR) has been used in SLMP work. Therefore, SBR was selected as a binder for the SLMP slurry first. Both SBR and PS can dissolve in toluene and xylene to form a uniform solution. The ability of binder solution to maintain uniformity of SLMP suspension for long periods is very important. Therefore, a solvent with higher viscosity was preferred. The viscosity of toluene and xylene are 0.55 cP and 0.61 cP at 25 degrees Celsius, respectively. This indicates that xylene should be better at sustaining SLMP slurry than that of toluene. However, both pure toluene and xylene are not viscous enough to maintain the SLMP dispersion in the slurry. The SLMP particles tended to float on the surface of the solvent because of the extremely small density of SLMP and low viscosity of the solution. In addition, after deposition on the anode surface the SLMP flew away after evaporation of the solvent because no attachment force existed between the SLMP and the laminate surface since polymer binder was not present. Therefore, a polymer binder was introduced into the solution processing method and its effect on the SLMP coating was further investigated.

Concentration/Viscosity of Binder Solution for SLMP Suspension

The viscosity of the binder solution was greatly increased by introduction of the polymer into the solution processing method of SLMP coating. Therefore, it was demonstrated that a well-dispersed SLMP suspension maintains uniform dispersion for long handling times. The introduced polymers act as binders to fix the SLMP on the anode surface after the solvent was evaporated. SBR and PS were selected as the binders. SBR has a strong cohesive ability that can provide good attachment between the SLMP and an anode surface. The characteristics of the polymer solution with different SBR concentration (0%, 0.5%, 1%, 3% and 5%) on SLMP coating were studied. The viscosity was 1.02 cP, 2.52 cP, 15.00 cP and 36.90 cP for 0.5%, 1%, 3% and 5% SBR solution, respectively at 20 degrees Celsius. The same amounts of SLMP were dispersed in each SBR solution to demonstrate the sustainability of each binder solution for SLMP slurry. Photo images were taken after the slurries were mixed and rested for different time durations, 0 seconds, 30 seconds and 120 seconds, respectively. It was demonstrated that the addition of polymer binder effectively increased the viscosity of the solution and maintained the uniform distribution of the SLMP in the slurry. It was also demonstrated that the higher the concentration of polymer binder solution, the better the sustainability of SLMP distribution in the slurry.

The morphology and distribution of SLMP coating with different SBR concentrations were studied with SEM. Significant differences were observed among the different concentrations at both low and high magnification images. For the coating with 0.5% SBR, it was observed that very few SLMP was coated on the anode surface. This is because, the viscosity for the 0.5% SBR solution was too low (1.02 cP) and the difference in density between lithium and xylene is large (the density for lithium is 0.534 g/cm$^3$, while the density for xylene is 0.87 g/cm$^3$). As a result, most of the SLMP floated on the surface of the coating suspension during the coating process and was removed by the doctor blade during application. When the SBR concentration increased to 1%, the viscosity increased to 2.52 cP, the SLMP distribution was sustained in the slurry for 120 seconds, and uniform SLMP coating was achieved on the anode surface. As the SBR concentration was increased to 3% and 5%, the SLMP coating was as uniform, but the number of SLMP coated on the laminate surface did not increase much as compared to the coating performed with 1% SBR solution. Thus, it was found that the ability to sustain SLMP slurry increased with higher viscosity and uniform SLMP coating was achieved when the viscosity of the binder solution was greater than 2.5 cP. Therefore, the binder concentration is set to be 1% in the following discussion. Further efforts focused on achieving the uniform coating and easy pressure activation. Minor adjustments could be made when other polymer binders are used.

Binder Species for High Efficient Pressure/Calender Activation

When polymer binder was introduced in the processing method, the activation feasibility and efficiency of the activation process were re-evaluated. A polymer shell was observed on the SLMP surface using SEM images of the SLMP with 5% SBR binder. In comparison, no polymer shell was observed at 1% binder solution, and very few shells were observed on SLMP coated with 3% SBR. One concern was whether the thin polymer shell would negatively affect the pressure activation process. Therefore, the SEM morphology of SLMP coated anode before and after adding electrolyte was studied, and 3% concentration of the polymer binder was used to demonstrate the effect of this polymer shell.

It was demonstrated that application of adequate pressure to the SLMP coated anode smashed most of the $Li_2CO_3$ coating of SLMP. After immersing the pressure activated, SLMP coated anode in electrolyte for 48 hours, the prelithiated anode was observed again via SEM. All the smashed SLMP disappeared from view. However, when taking a closer look through high magnification SEM image, a few un-reacted SLMP particles were found. The observed oblate morphology suggested that these particles had been exposed to pressure, but the lithium did not directly electrically contact the electrode, the lithium did not react with the anode and electrolyte. Since SBR is known for high elasticity, the shell was not efficiently broken under pressure. This SBR shell on the SLMP surface prevented electrical contact between the lithium core, anode and electrolyte and lead to insufficient SLMP pressure activation.

There were two ways to eliminate the inefficient activation caused by the polymer binder shell. First, there was less chance of forming a complete shell when the binder concentration is lower. However, lower binder concentration may result in other issues, such as non-uniform SLMP dispersion, poor sustainability and poor attachment on the anode surface, etc. Second, polymer binders with less elasticity were chosen as an alternative for this application. Thus, polystyrene (PS) was introduced. The transition temperature (Tg) is 95 degrees Celsius for PS and −65 degrees Celsius for SBR, which indicates that PS is more brittle and easier to break compared to SBR, which can help the pressure activation process. Additionally, PS with high molecular weight is available, so a PS solution with a higher viscosity relative to an SBR solution with the same concentration can be obtained.

Three sets of binder solutions (1% PS by weight, 1% SBR by weight, and 0.5% PS with 0.5% SBR by weight) were introduced to enhance the binder composition for easier pressure activation. The SEM images of SLMP loading on graphite surface before, after calendering and after immersing in electrolyte for 48 hours with 1% PS, 1% SBR and 0.5% PS with 0.5% SBR binder solutions were obtained. Uniform SLMP coating was observed for SLMP coating with 1% SBR and 0.5% PS with 0.5% SBR binder solutions. The SLMP was smashed on the graphite surface by calendering and the anodes had similar morphology with different binder solutions. After the calendered electrodes were immersed in the electrolyte for 48 hours, all the smashed SLMP particles disappeared from SEM view. Almost none of the residual SLMP was observed under the high magnification SEM observation for SLMP coating with 1% PS solution and 0.5% PS with 0.5% SBR solution. Only two residual SLMP were observed for the 1% SBR solution. This indicated that the enhanced binder solutions, which partially or totally use PS as polymer binder, had a positive effect in achieving high-pressure activation efficiency.

The Uniformity of SLMP Coating with Binder Solution

To investigate the sustainability of the three binder solutions, SLMP slurries were made with the 1% PS, 1% SBR and 0.5% PS with 0.5% SBR solutions, respectively. The viscosity of the binder solutions with 1% PS, 1% SBR and 0.5% PS with 0.5% SBR is 4.83 cP, 2.52 cP and 3.60 cP, respectively at 20 degrees Celsius. This provided further evidence that PS with high molecular weight can lead to higher viscosity. Photo images of the SLMP suspension were taken after different time durations for 0 seconds, 30 seconds and 120 seconds. It was observed that in all three solvents, SLMP was uniformly distributed for longer than 120 seconds. The phase separation of SLMP slurry began to be observable after 5 to 6 minutes. This indicated that this composition of polymer binder provided sufficient time to process the homogenously dispersed SLMP suspension with the continuous coating procedure.

Doctor blade method was performed for coating the SLMP in binder solution (1% PS, 1% SBR and 0.5% PS with 0.5% SBR in xylene). Photo images of SLMP coated graphite anodes with different binder solutions were used to exhibit their abilities in achieving uniform SLMP coating and good SLMP attachment. Although with three binder solutions, the sustainability of SLMP slurries was comparable and the appearances of SLMP coatings were similar before solvent evaporation. The SLMP coating with 1% PS binder solution exhibited poor attachment on the electrode surface. Most of SLMP particles tended to float to the edge instead of attaching on the anode surface after the solvent evaporated. However, with the 1% SBR and the 0.5% PS with 0.5% SBR binder solutions, a uniform SLMP coating and good attachment of SLMP on the anode surface was achieved after evaporation of the solvent. Not to be bound by theory but it is believed that the reason for this difference is that the transition temperature (Tg) is 95 degrees Celsius for PS and −65 degrees Celsius for SBR. The glass transition temperature is the temperature below which the polymers are in glass phase and the polymer structure is rigid. Therefore, at room temperature (25 degrees Celsius), the PS was in brittle glassy state, and could not act as soft glue; but the SBR was in soft, flexible rubbery state, and could act as good glue to fix SLMP on the anode surface. It is believed that the high flexibility of the SBR chemical structure contributed to the good attachment of SLMP with SBR binder. In the case of 1% PS without SBR, it was believed that the poor SLMP attachment was caused by the rigid PS structure. Based on this knowledge, the two polymers were combined to form a mixed binder solution. The flexible SBR can help achieve good SLMP attachment, while the rigid PS can help achieve easier pressure activation. Therefore, with the overall consideration of achieving long sustained SLMP slurry, uniform SLMP coating, good SLMP adhesion and easy activation, the best composition of binders and solvent combination was believed to be 0.5% PS with 0.5% SBR binder in xylene solution for the processing method, and a superb coating effect was observed.

Prelithiation Effect in Graphite/NMC Full-Cell

Figure 3A:
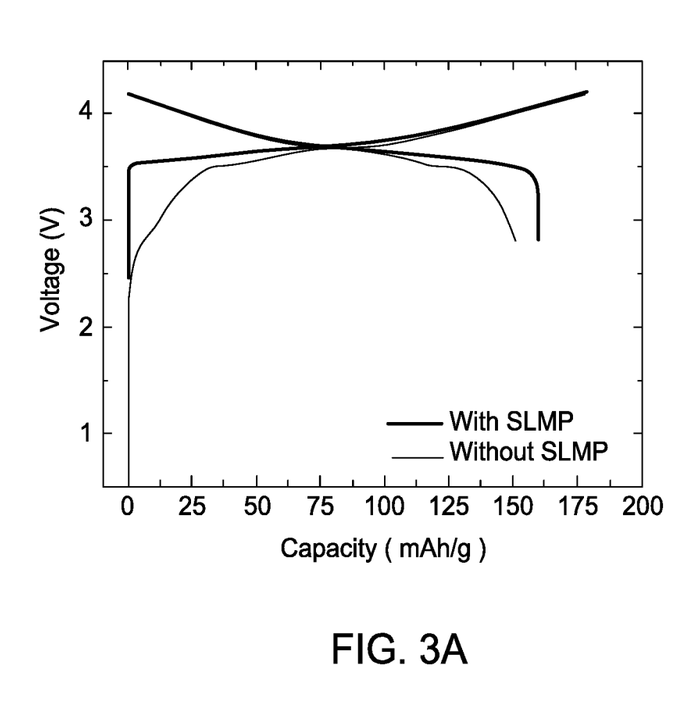
FIG. 3A is a plot depicting the voltage profile for the first cycle of a graphite/NMC full-cell without and with SLMP in accordance with one or more implementations of the present disclosure.
Figure 3B:
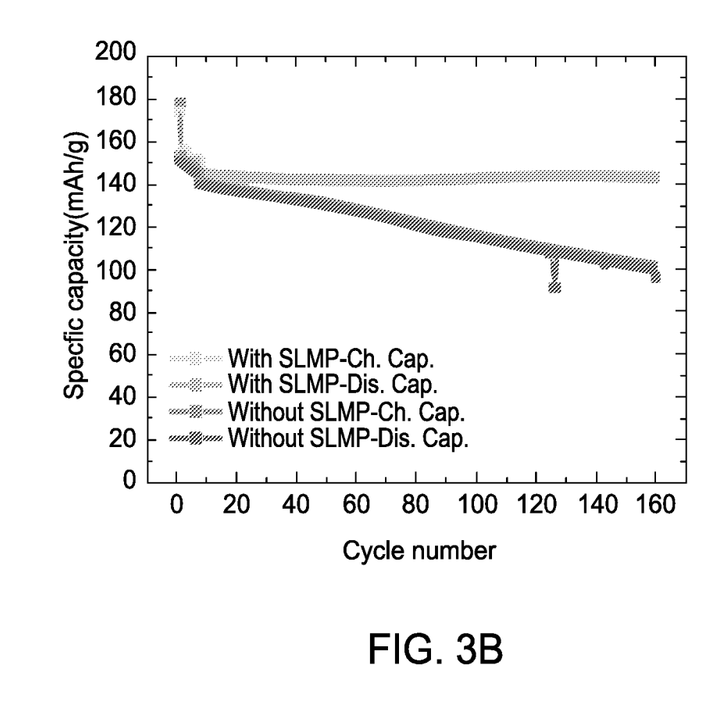
FIG. 3B is a plot depicting cycling performance for the first cycle of a graphite/NMC full-cell without and with SLMP in accordance with one or more implementations of the present disclosure.

Two types of cell chemistries have been used to demonstrate the prelithiation effect of SLMP coated using the solution processing methods described herein. These two types of cell chemistries include Graphite/NMC full-cell and high-energy density SiO/NMC full-cell. The prelithiation effects of SLMP on graphite/NMC full-cell and graphite half-cell are plotted in FIGS. 3A-3F. FIG. 3A is a plot depicting the first cycle voltage profile for graphite/NMC full-cells with and without SLMP prelithiation. In the voltage region below 3.5 V, the cell without SLMP prelithiation shows charge capacity, this corresponds to the lithiation of graphite anode with the SEI formation in the first cycle. While for cells with SLMP prelithiation, the SEI has been formed in the prelithiation process before cycling and the graphite has already been partially lithiated, so the open circuit voltage starts from 3.5 V and almost no capacity is shown below 3.5 V. The lithium ion loss in the full-cell during SEI formation can be compensated by the addition of SLMP so the first cycle coulombic efficiency is increased up to 87.8%, which is higher than the 82.35% for graphite/NMC cells without SLMP prelithiation, as calculated from FIG. 3B. In addition, the cycle stability of graphite/NMC full-cell can be greatly improved with the SLMP prelithiation. This indicates that the failure mechanism of irreversible lithium loss in the full-cell can be partially compensated by the addition of the extra lithium ions from SLMP.

Figure 3C:
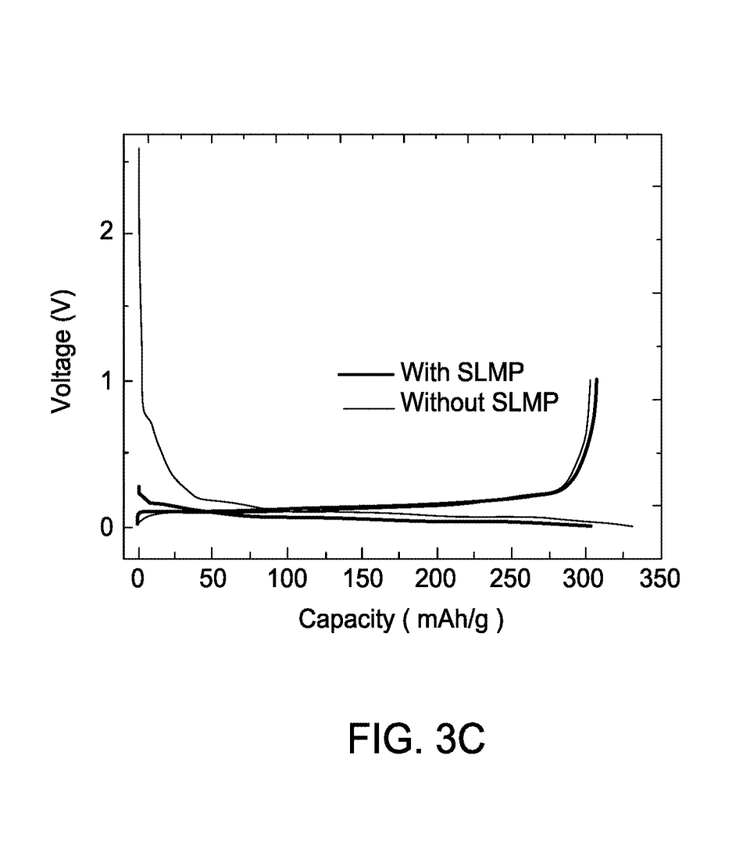
FIG. 3C is a plot depicting the voltage profile for the first cycle of a graphite half-cell without and with SLMP in accordance with one or more implementations of the present disclosure.
Figure 3D:
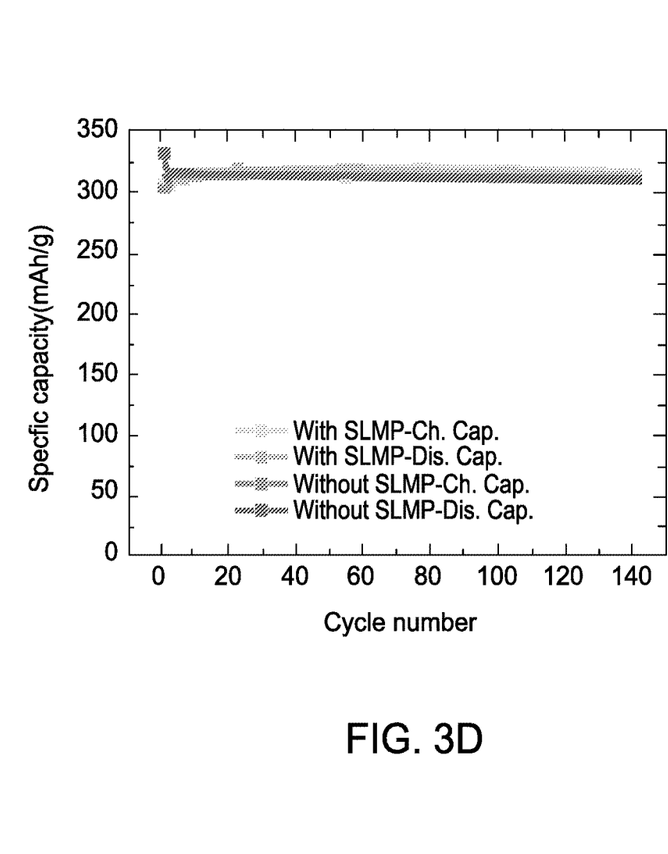
FIG. 3D is a plot depicting cycling performance for the first cycle of a graphite half-cell without and with SLMP in accordance with one or more implementations of the present disclosure.
Figure 3E:
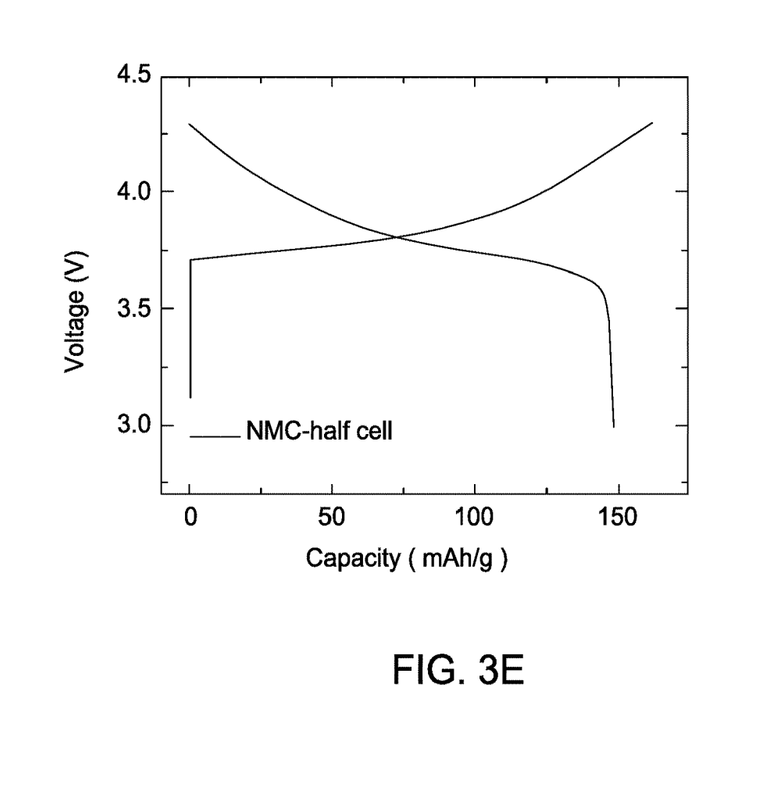
FIG. 3E is a plot depicting the voltage profile for the first cycle of an NMC half-cell without and with SLMP in accordance with one or more implementations of the present disclosure.
Figure 3F:
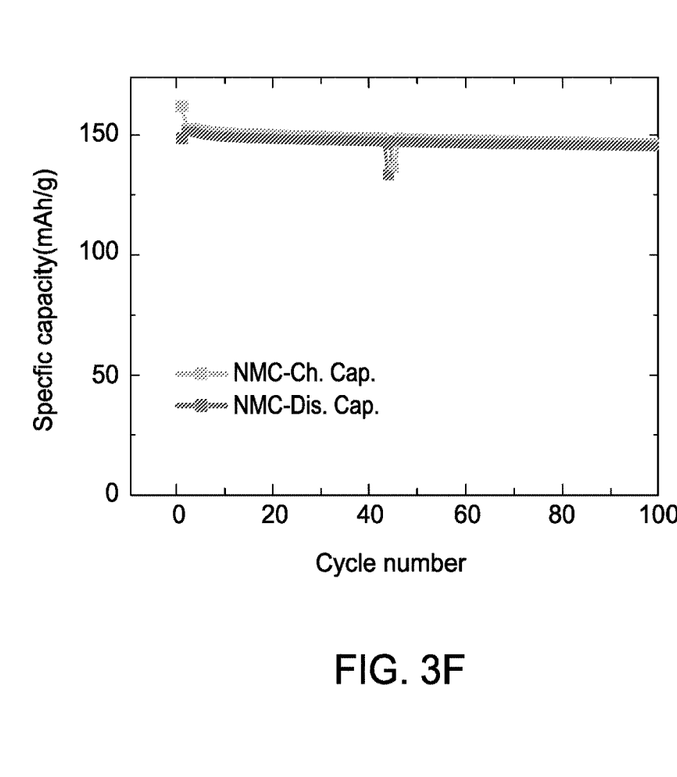
FIG. 3F is a plot depicting cycling performance for the first cycle of an NMC half-cell without and with SLMP in accordance with one or more implementations of the present disclosure.

The prelithiation effect of SLMP on an anode can also be observed in voltage profile of the graphite half-cell, as depicted in FIG. 3C. The voltage plateau at 0.7-0.8 V in the half-cell without SLMP prelithiation indicates the SEI formation at the beginning of the lithiation process. As demonstrated in FIG. 3C, the start voltage of SLMP prelithiated half-cell has already reached lower than 0.3 V, which further proves that the SEI formation is achieved in the SLMP prelithiation process. The cycle performances of graphite and the NMC half-cells are shown in FIGS. 3D and 3F, respectively, along with the voltage profile of NMC half-cell for reference, as depicted in FIG. 3E.

Prelithiation Effect in SiO/NMC Full-Cell

Figure 4A:
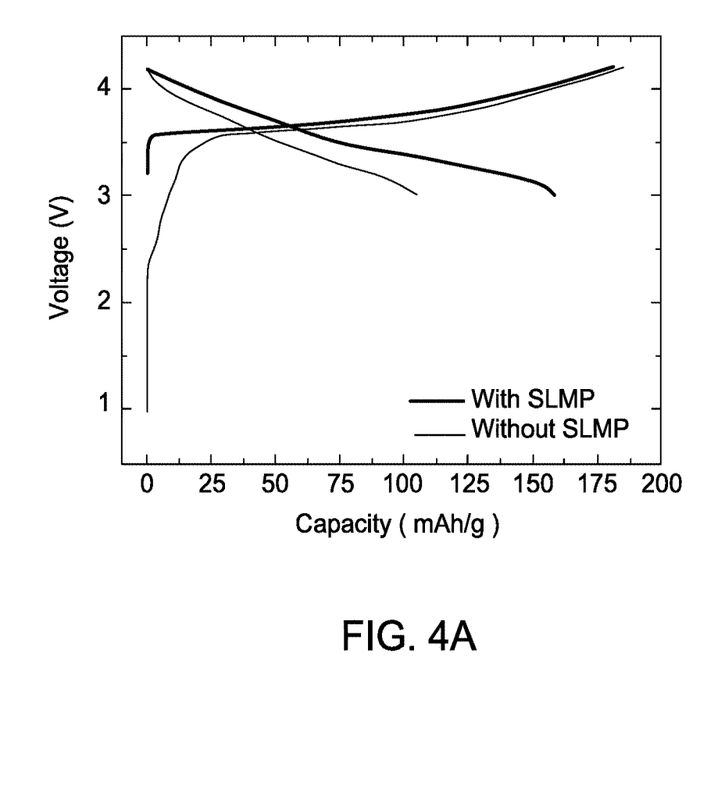
FIG. 4A is a plot depicting the voltage profile for the first cycle of a SiO/NMC full-cell without and with SLMP in accordance with one or more implementations of the present disclosure.
Figure 4B:
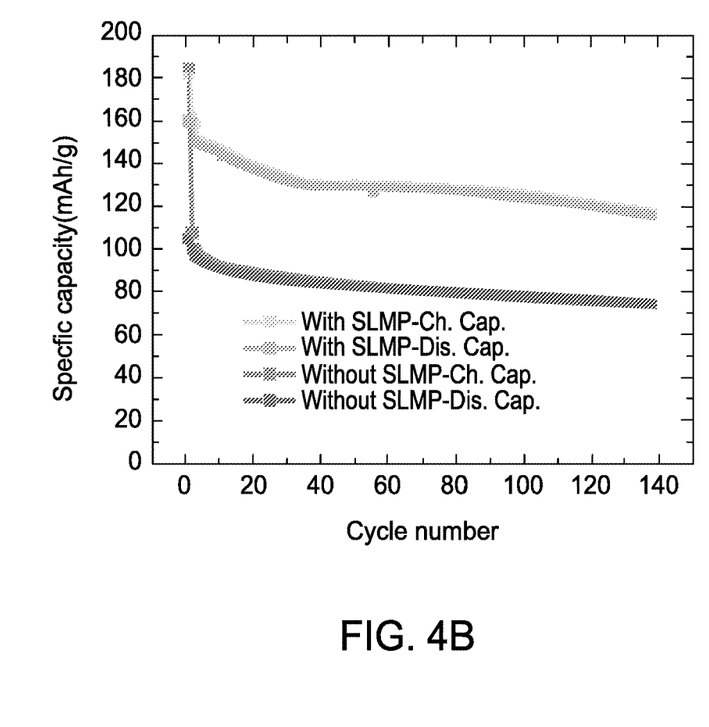
FIG. 4B is a plot depicting cycling performance for the first cycle of a SiO/NMC full-cell without and with SLMP in accordance with one or more implementations of the present disclosure.

FIG. 4A is a plot depicting the voltage profile for the first cycle of a SiO/NMC full-cell without and with SLMP in accordance with one or more implementations of the present disclosure. FIG. 4B is a plot depicting cycling performance for the first cycle of a SiO/NMC full-cell without and with SLMP in accordance with one or more implementations of the present disclosure. The prelithiation of SLMP becomes crucially important in high-energy density anode, such as Si or SiO, etc., because of their up to 40%-50% first cycle coulombic loss. The prelithiation effect of SLMP is demonstrated by SiO/NMC full-cells coated using the solution processing methods described herein. The SiO anode is composed of SiO nanoparticles (95 wt. %) with conductive binder (PFM, 5 wt. %). Significant improvement was observed in the SLMP prelithiated full-cells, as depicted in FIG. 4B. The first cycle CE increased from 56.78% (without SLMP prelithiation) to 88.12% (with SLMP prelithiation) in accordance with the processing method described herein. This is because that, in the full-cell design, the lithium ions in the cathode are accurately calculated to match the capacity of the anode and not much excess lithium ion exists. The formation of SEI in the first few cycles consumes most of the excess lithium ions and the long-term cycle ability suffers due to the lithium ion loss. In addition, the lithium ion consumption during the SEI formation is a lot higher in the SiO anode than in graphite anode. Therefore, without the prelithiation of SLMP, the SiO/NMC full-cell can only start with a capacity of approximately 110 $mAhg^{-1}$ and dropped to approximately 80 $mAhg^{-1}$ after 100 cycles (based on cathode weight). While with the prelithiation of SLMP, the SiO/NMC full-cell maintained a reversible capacity of approximately 130 $mAhg^{-1}$ for over one hundred cycles. Therefore, with the coating of SLMP onto the anode of the full-cell, a calculated amount of lithium ions is added into the system and compensates for the lithium ion loss during SEI formation. In this way, a much prominent improvement in cyclability can be observed in SiO/NMC full-cell.

In summary, some implementations of the present disclosure provide a simple solution processing method to achieve large area, uniform SLMP coating on an anode surface for the prelithiation of lithium-ion batteries. The binder solution described herein can sustain uniform distribution in the slurry to carry out the coating process. Additionally, with the addition of polymer binders, the SLMP can be fixed on the anode surface for easy transportation before activation. With the consideration of the sustainability and coating performance, the SLMP adhesion and the ease of activation, the best composition of binders and solvent combination is 0.5% PS with 0.5% SBR binder in xylene solution for the processing method, and the superb coating effect can be obtained. The prelithiation effect with this method is applied both in graphite half-cells, graphite/NMC full-cells and SiO half-cells, SiO/NMC full-cells, with improvements in cycle performance and higher first cycle coulombic efficiency than their corresponding cells without SLMP prelithiation. These results demonstrate that the method of the present disclosure has a positive effect and wide applicability in different anode systems with different cell chemistries.

When introducing elements of the present disclosure or exemplary aspects or implementation(s) thereof, the articles "a," "an," "the" and "said" are intended to mean that there are one or more of the elements.

The terms "comprising," "including" and "having" are intended to be inclusive and mean that there may be additional elements other than the listed elements.

All amounts, ratios, proportions and other measurements are by weight unless stated otherwise. All percentages refer to weight percent based on total composition according to the practice of the present disclosure unless stated otherwise.

While the foregoing is directed to implementations of the present disclosure, other and further implementations of the disclosure may be devised without departing from the basic scope thereof, and the scope thereof is determined by the claims that follow.

The invention claimed is:

1. A method for making an electrode structure, comprising:
   forming a binder solution of a hydrocarbon solvent, styrene-butadiene-rubber(SBR) and polystyrene (PS);
   adding stabilized lithium metal powder to the binder solution to form a slurry;
   depositing a film of the slurry on a substrate; and
   exposing the film and substrate to a drying process to form the electrode structure, wherein a concentration of SBR in the binder solution is between 0.1% and 5% by weight of a total weight of the binder solution,
wherein a concentration of PS in the binder solution is between 0.1% and 5% by weight of the total weight of the binder solution, and
wherein depositing the film comprises a slot-die coating process.

2. The method of claim 1, further comprising exposing the film on the substrate to a calendering process to activate the stabilized lithium metal powder.

3. The method of claim 1, wherein the substrate is a graphite anode.

4. The method of claim 1, wherein the substrate is a silicon oxide (SiO) anode.

5. The method of claim 1, wherein the hydrocarbon solvent is xylene.

6. The method of claim 1, wherein a viscosity of the binder solution is 2.5 centipoise (cp) or greater at 20 degrees Celsius.

7. The method of claim 1, wherein the concentration of SBR in the binder solution is between 0.1% and 1% by weight of the total weight of the binder solution.

8. The method of claim 7, wherein the concentration of PS in the binder solution is between 0.1% and 1% by weight of the total weight of the binder solution.

9. The method of claim 1, wherein the concentration of the SBR in the binder solution is 0.5% by weight and the concentration of PS in the binder solution is 0.5% by weight of the total weight of binder solution.

10. The method of claim 1, wherein particles of the stabilized lithium metal powder are coated with $Li_2CO_3$.

11. The method of claim 1, wherein the drying process evaporates the hydrocarbon solvent from the electrode structure.

12. A method of forming a battery, comprising combining the electrode structure of claim 1 with a positive electrode structure, a first current collector contacting the positive electrode structure, a second current collector contacting the electrode structure and a separator positioned between the positive electrode structure and the electrode structure.

13. A method for making an electrode structure, comprising:
providing a binder suspension, wherein the binder suspension informed by:
forming a binder solution by dissolving styrene-butadiene-rubber(SBR) and polystyrene (PS) in xylene,
wherein a concentration of SBR in the binder solution is between 0.1% and 1% by weight of a total weight of the binder solution,
wherein a concentration of PS in the binder solution is between 0.1% and 1% by weight of the total weight of the binder solution; and
wherein a viscosity of the binder solution is between 2.5 centipoise (cp) and 4.8 cp at 20 degree Celsius;
adding stabilized lithium metal powder (SLMP) to the binder solution to form the binder suspension;
depositing a film of the binder suspension on a graphite anode; and
exposing the film and the graphite anode to a drying process to form the electrode structure.

14. The method of claim 13, further comprising:
exposing the SLMP to a compression process to active the SLMP.

15. The method of claim 13, wherein the stabilized lithium metal powder is present in an amount of 0.5 wt. % to 4 wt. % of the binder suspension, and a remainder is the binder solution based on the total weight of the binder suspension.

16. The method of claim 15, wherein PS and SBR are present in an amount of 1% total and the remainder of the binder solution is xylene based on the total weight of the binder solution.

17. The method of claim 13, wherein the concentration of the SBR in the binder solution is 0.5% by weight and the concentration of PS in the binder solution is 0.5% by weight of the total weight of binder solution.

18. The method of claim 13, wherein particles of the stabilized lithium metal powder are coated with $Li_2CO_3$.

19. The method of claim 13, wherein depositing the film of the binder suspension comprises a slot-die coating process.

* * * * *

UNITED STATES PATENT AND TRADEMARK OFFICE
CERTIFICATE OF CORRECTION

Page 1 of 2

PATENT NO. : 11,069,888 B2
APPLICATION NO. : 16/067795
DATED : July 20, 2021
INVENTOR(S) : Gao Liu et al.

It is certified that error appears in the above-identified patent and that said Letters Patent is hereby corrected as shown below:

In the Drawings

On sheet 3 of 6, in Figure 3B (Y-axis), Line 1, delete "Specfic" and insert -- Specific --, therefor.

On sheet 4 of 6, in Figure 3D (Y-axis), Line 1, delete "Specfic" and insert -- Specific --, therefor.

On sheet 5 of 6, in Figure 3F (Y-axis), Line 1, delete "Specfic" and insert -- Specific --, therefor.

On sheet 6 of 6, in Figure 4B (Y-axis), Line 1, delete "Specfic" and insert -- Specific --, therefor.

In the Specification

In Column 4, Line 17, delete "potentinal" and insert -- potential --, therefor.

In Column 5, Line 16, delete "polythiopene." and insert -- polythiophene. --, therefor.

In Column 5, Line 23, delete "Li(Ni$_{0.8}$CO$_{0.15}$Al$_{0.05}$)O$_2$," and insert -- Li(Ni$_{0.8}$Co$_{0.15}$Al$_{0.05}$)O$_2$, --, therefor.

In Column 7, Line 22, delete "wt, %" and insert -- wt. % --, therefor.

In Column 7, Line 27, delete "wt %," and insert -- wt. %, --, therefor.

In Column 7, Line 28, delete "0/0," and insert -- %, --, therefor.

In Column 7, Line 29, delete "wt, %," and insert -- wt. %, --, therefor.

In Column 7, Line 30, delete "0/0," and insert -- %, --, therefor.

In Column 7, Line 30, delete "wt %," and insert -- wt. %, --, therefor.
In Column 7, Line 30, after "4.8 wt. %," delete "%,".

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*

In Column 7, Line 40, delete "0/0," and insert -- %, --, therefor.

In Column 7, Line 47, after "wt." insert -- % --.

In the Claims

In Column 16, Line 4, in Claim 13, delete "informed" and insert -- is formed --, therefor.